(12) United States Patent
Atarashi

(10) Patent No.: US 7,486,043 B2
(45) Date of Patent: Feb. 3, 2009

(54) CONTROLLER FOR MOTOR

(75) Inventor: Hirofumi Atarashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 147 days.

(21) Appl. No.: 11/714,765

(22) Filed: Mar. 7, 2007

(65) Prior Publication Data

US 2007/0222404 A1    Sep. 27, 2007

(30) Foreign Application Priority Data

Mar. 22, 2006  (JP) ............................. 2006-078551
May 12, 2006  (JP) ............................. 2006-134443

(51) Int. Cl.
*H02P 6/18* (2006.01)

(52) U.S. Cl. .................. 318/494; 318/439; 318/721; 318/723; 318/727

(58) Field of Classification Search ................ 318/439, 318/494, 400.02, 721, 723, 727
See application file for complete search history.

(56) References Cited

U.S. PATENT DOCUMENTS 6,396,229 B1* 5/2002 Sakamoto et al. ...... 318/400.02

7,342,378 B2* 3/2008 Sakamoto et al. ........... 318/717

FOREIGN PATENT DOCUMENTS

JP          2002-204541 A       7/2002

* cited by examiner

*Primary Examiner*—Paul Ip
(74) *Attorney, Agent, or Firm*—Arent Fox LLP.

(57) ABSTRACT

A controller for a motor performs field weakening control by changing a phase difference between two rotors, which are concentrically disposed, and by accurately recognizing the phase difference. The controller for a motor includes an actuator and a planetary gear mechanism that change a rotor phase difference on the basis of a command value of a phase difference (rotor phase difference) between an outer rotor and an inner rotor of a motor in field weakening control, a constant calculator which calculates an induced voltage constant of the motor and an inductance of a q-axis armature on the basis of a d-axis current detection value, a q-axis current detection value, d-axis voltage command value, a q-axis voltage command value, and an angular velocity of the motor, a rotor phase difference estimator which determines an estimated value of the rotor phase difference on the basis of the induced voltage constant and the q-axis inductance, and a current command value determiner which determines a command value of d-axis current and a command value of q-axis current by using the estimated value.

8 Claims, 12 Drawing Sheets

CONTROLLER FOR MOTOR

BACKGROUND OF THE INVENTION

1. Field of the Invention

The present invention relates to a controller for a motor adapted to carry out field weakening control of a permanent magnet field type rotary motor by changing a phase difference between two rotors, which are concentrically disposed.

2. Description of the Related Art

Hitherto, there has been known a motor which is constituted of a permanent magnet field type rotary motor equipped with a first rotor and a second rotor concentrically provided around a rotating shaft and which is adapted to conduct field weakening control by changing the phase difference between the first rotor and the second rotor according to a rotational velocity (refer to, for example, Japanese Patent Application Publication No. 2002-204541).

In such a conventional motor, the first rotor and the second rotor are connected through the intermediary of a member that displaces in the radial direction when subjected to a centrifugal force. The motor is configured such that, when the motor is in a halting state, the magnetic pole of the permanent magnet disposed in the first rotor and the magnetic pole of the permanent magnet disposed in the second rotor are in the same direction so as to provide maximum magnetic fluxes of the field, and the phase difference between the first rotor and the second rotor increases due to a centrifugal force as the rotational velocity of the motor increases, thus reducing the magnetic fluxes of the field.

FIG. 12 shows a range in which the field of the motor need to be weakened. In the figure, the axis of ordinates indicates output torque Tr and the axis of abscissas indicates the number of revolutions N. The character "u" in FIG. 12 denotes an orthogonal line of the motor. The line u is formed by connecting points at which a phase voltage of the motor becomes equal to a supply voltage, depending on a combination of the number of revolutions and an output torque when the motor is run without carrying out the field weakening control. The character X in FIG. 12 denotes a range in which the field is not required to be weakened, while Y denotes a range in which the field is required to be weakened.

As shown in FIG. 12, the range Y in which the field need to be weakened is determined by the number of revolutions N and the output torque Tr of the motor. Hence, the conventional field weakening control, which depends merely on the number of revolutions, inconveniently results in an excessive or insufficient control amount for weakening the field.

Basically, the field weakening control is intended to reduce a back electromotive force produced in an armature due to the revolution of the motor so as to restrain a voltage between terminals of the armature from increasing to be higher than a supply voltage, thereby allowing the motor to be used in a higher revolution range. When changing the phase difference between the first rotor and the second rotor by the number of revolutions of the motor or a centrifugal force, only the number of revolutions is the parameter for changing the weakening of the field. This inconveniently prevents flexible changes of the controllable range of output torque or the number of revolutions of the motor.

Furthermore, in a motor working also as a generator, the operating efficiency is generally improved by using different field control amounts for a driving mode (positive output torque) and a power generating mode (negative output torque), respectively, when the number of revolutions remains the same. However, when changing the phase difference between the first rotor and the second rotor by the number of revolutions or a centrifugal force, it is disadvantageous that the field control amount cannot be changed between the driving mode and the power generating mode.

In addition, when changing the phase difference between the first rotor and the second rotor by a centrifugal force, the phase difference based on the number of revolutions may change, depending on a change of an operational condition or the like of the motor. Furthermore, the controller of the motor does not detect an actual phase difference between the first rotor and the second rotor, so that an expected field weakening effect may not be obtained.

SUMMARY OF THE INVENTION

The present invention has been made with a view of the aforesaid background, and it is an object of the invention to provide a controller for a motor capable of carrying out field weakening control by recognizing a phase difference between two rotors, which are disposed around a rotating shaft, with higher accuracy without depending on the number of revolutions of the motor.

To this end, according to the present invention, there is provided a controller for a motor adapted to control an operation of a permanent magnet field type rotary motor including a first rotor and a second rotor, which have a plurality of fields made of permanent magnets and which are disposed around a rotating shaft, by carrying out field control as a result of changing a rotor phase difference as a phase difference between the first rotor and the second rotor. The field control includes field weakening control for reducing the magnetic fluxes of the fields of the motor and field strengthening control for increasing the fluxes of the fields of the motor.

The controller for a motor in accordance with the present invention includes a rotor phase difference changer for changing the rotor phase difference on the basis of a command value of the rotor phase difference in the field control; a current detector for detecting a current flowing through an armature of the motor; a rotor position detector for detecting a position of the first rotor; an angular velocity detector for detecting an angular velocity of the motor; an induced voltage constant calculator which converts the motor into an equivalent circuit based on a two-phase AC fixed coordinate system or a two-phase DC rotary coordinate system based on a position of the first rotor and which calculates an induced voltage constant of the motor on the basis of the converted values in the equivalent circuit of a voltage between the terminals of the armature of the motor and a current flowing through the armature, and the angular velocity of the motor; a rotor phase difference estimator for estimating the rotor phase difference on the basis of the induced voltage constant; and an energization controller for controlling the energization of the motor on the basis of the estimated value of the rotor phase difference provided by the rotor phase difference estimator.

With this arrangement, the rotor angle changer makes it possible to change the rotor phase difference according to the command value of the rotor phase difference in the field control without depending on the number of revolutions of the motor. Therefore, the field control can be accomplished by changing the rotor phase difference according to a command value of an output torque of the motor. As the rotor phase difference changes, the magnetic flux of a field changes accordingly, so that the induced voltage constant of the motor changes. Thus, a correlation between the rotor phase difference and the induced voltage constant Ke of the motor enables the rotor phase difference estimator to estimate the rotor phase difference on the basis of the induced voltage constant of the motor calculated by the induced voltage constant calculator. The energization controller controls the energization of the motor on the basis of the estimated value of the rotor phase difference. This enables the energization controller to carry out the energization control while grasping an actual field condition, which is an operation parameter of the motor. Thus, the accuracy of matching between an operational condition of the motor and a control value of the amount of energization can be improved and the motor can be efficiently operated.

The induced voltage constant calculator controls the amount of energization of the motor such that the signs of converted values in the equivalent circuit of the currents flowing through the armature of the motor at different points will be opposite from each other if the amount of energization of the motor is a predetermined value or less, and calculates an induced voltage constant of the motor on the basis of the difference between the converted values in the equivalent circuit of the voltages between the terminals of the armature of the motor at the different points, the difference between the converted values in the equivalent circuit of the currents flowing through the armature of the motor at the different points, and an angular velocity of the motor.

With this arrangement, the calculation error of an induced voltage constant of the motor can be reduced by increasing the difference in energization amount between the different points and by using the difference in energization amount if the energization amount of the motor is a predetermined value or less. This will be discussed in detail hereinafter.

The equivalent circuit is based on a two-phase DC rotary coordinate system composed of a d-axis extended in the direction of the magnetic flux of a field of the motor and a q-axis orthogonal to the d-axis. The controller for a motor has a q-axis armature inductance calculator for calculating the inductance of an armature disposed on the q-axis on the basis of the converted values in the equivalent circuit of the voltage between the terminals of the armature of the motor and the current flowing through the armature, and the angular velocity of the motor. The rotor phase difference estimator estimates the rotor phase difference on the basis of the inductance of the armature disposed on the q-axis and the induced voltage constant of the motor.

With this arrangement, if the magnetic flux of a field changes due to a change in the rotor phase difference, then the inductance of the armature disposed on the q-axis changes accordingly. This allows the induced voltage constant calculator to estimate the rotor phase difference on the basis of the inductance of the armature disposed on the q-axis and the induced voltage constant of the motor, thus permitting higher accuracy of the estimation of the rotor phase difference to be achieved.

Further, the q-axis armature inductance calculator controls the current flowing through the armature disposed on the q-axis such that the signs of currents flowing through the armature disposed on the q-axis at different points will be opposite from each other if the current flowing through the armature disposed on the q-axis is a predetermined value or less, and calculates an inductance of the armature disposed on the q-axis on the basis of the difference between the converted values in the equivalent circuit of the voltages between the terminals of the armature of the motor at the different points, the difference between the converted values in the equivalent circuit of the currents flowing through the armature of the motor at the different points, and an angular velocity of the motor.

With this arrangement, the calculation error of an inductance of the armature disposed on the q-axis can be reduced by increasing the difference between the converted values in the equivalent circuit of the currents flowing through the armature of the motor at the different points and by using the increased difference if the current flowing through the armature disposed on the q-axis is a predetermined value or less. This will be discussed in detail hereinafter.

Further, the q-axis armature inductance calculator calculates an inductance of the armature disposed on the q-axis on the basis of the difference between the converted values in the equivalent circuit of voltages between the terminals of the armature of the motor at the different points, the difference between the converted values in the equivalent circuit of the currents flowing through the armature of the motor at the different points, and an angular velocity of the motor.

With this arrangement, it is possible to restrain a calculation error of an inductance of the armature disposed on the q-axis of the motor from increasing by using the difference between the converted values in the equivalent circuit of the voltages between the terminals of the armature of the motor at different points and the difference between the converted values in the equivalent circuit of the currents flowing through the armature of the motor at the points if the current flowing through the armature of the motor is extremely small. This will be discussed in detail hereinafter.

Further, the induced voltage constant calculator estimates the inductance of the armature disposed on the d-axis on the basis of a command value of the rotor phase difference in the field control, and calculates the induced voltage constant by using the estimated value of the inductance of the armature disposed on the d-axis.

With this arrangement, an inductance Ld of the armature disposed on the d-axis changes as the rotor phase difference changes, so that the accuracy of the estimation of the rotor phase difference can be further improved by estimating the rotor phase difference by using the inductance of the armature disposed on the d-axis in addition to the inductance of the armature disposed on the q-axis and the induced voltage constant of the motor.

The controller for a motor further includes a field weakening current corrector for controlling the amount of energization of the armature disposed on the d-axis so as to reduce a field weakening shortage due to a change in the rotor phase difference on the basis of a difference between a command value of the rotor phase difference when the field of the motor is weakened by the field control and an estimated value of the rotor phase difference obtained by the phase difference estimator.

With this arrangement, if a difference occurs between a command value of the rotor phase difference when weakening the field of the motor by the field control and an estimated value due to a response delay or the like of the rotor phase difference changer, then the amount of energization of the armature on the d-axis is controlled to reduce the field weakening shortage due to a change in the rotor phase difference by the field weakening current corrector. This makes it possible to restrain a shortfall of field weakening from occurring due to an influence of a response delay or the like of the rotor phase difference changer.

DESCRIPTION OF THE PREFERRED EMBODIMENTS

Figure 1:
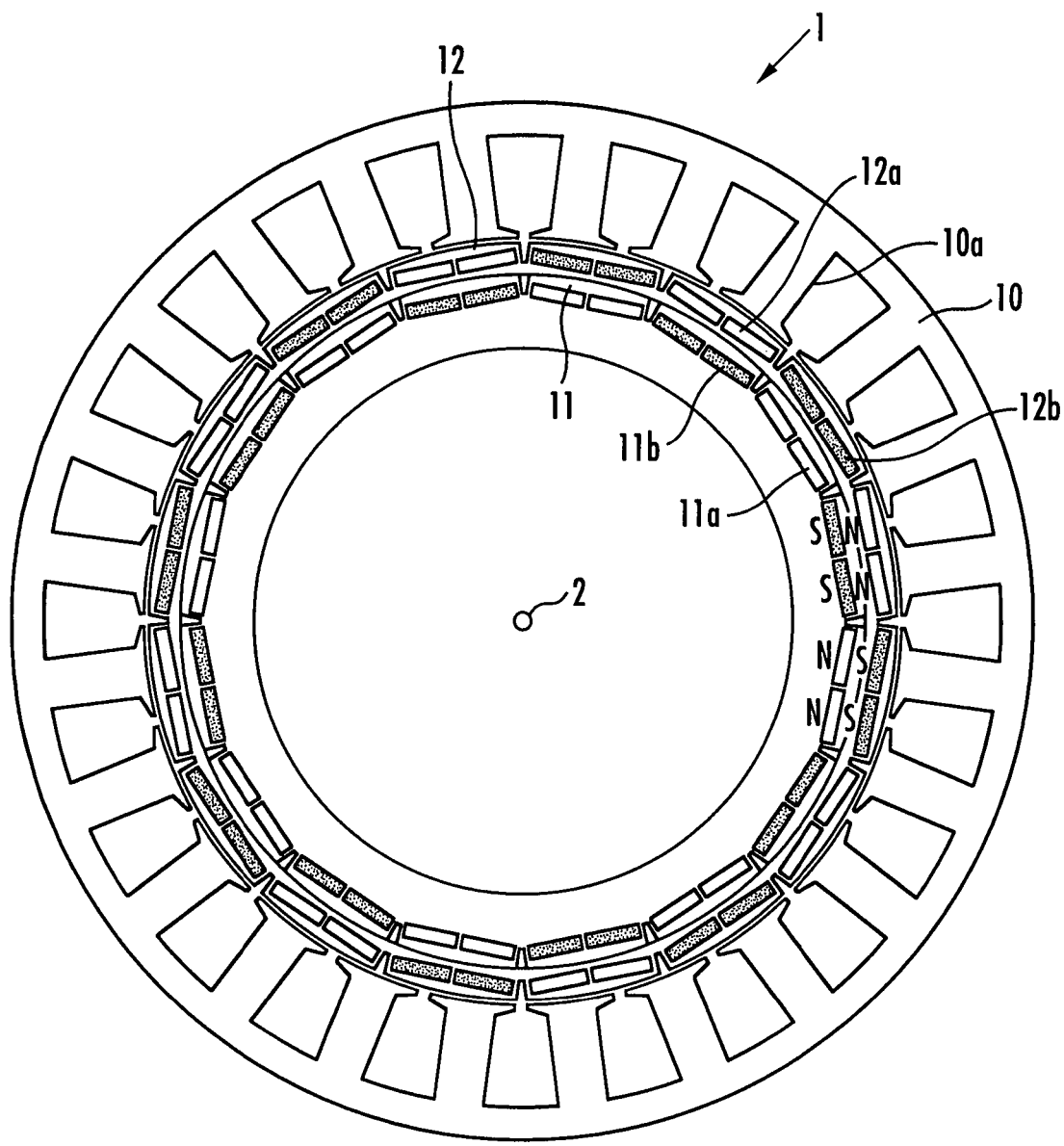
FIG. 1 is a configuration diagram of a DC brushless motor provided with a double rotor.
Figure 2:
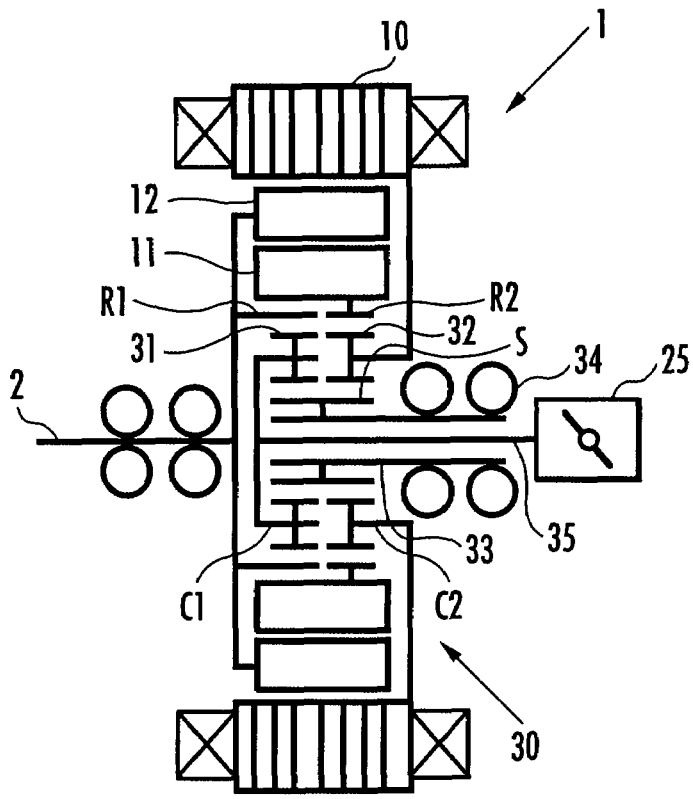
FIG. 2 is a configuration diagram and an operation explanatory diagram of a mechanism for changing a phase difference between an outer rotor and an inner rotor of a DC brushless motor shown in FIG. 1.
Figure 2:
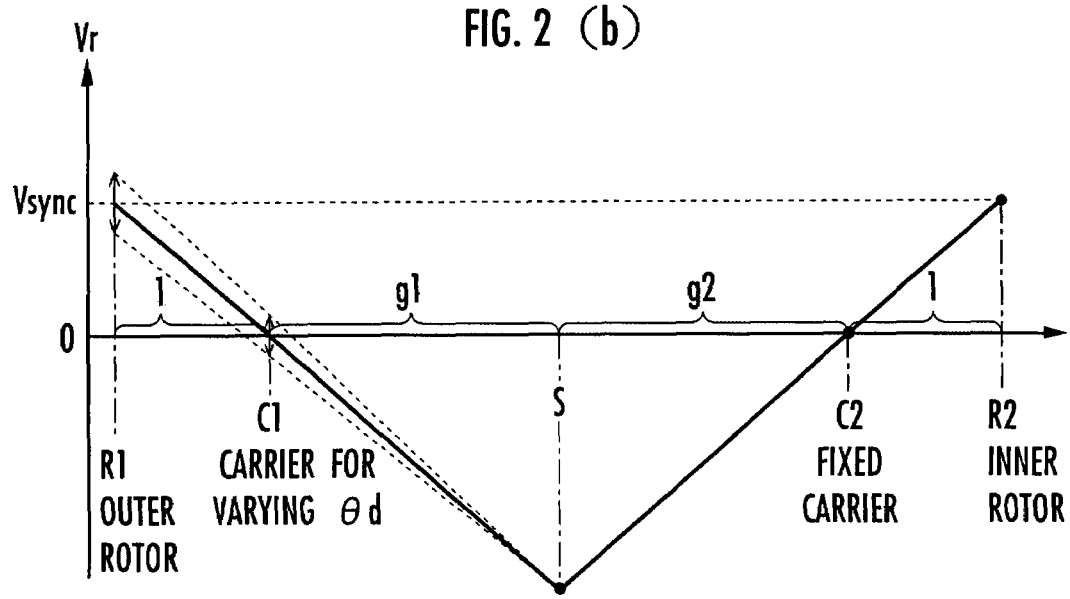
Figure 3:
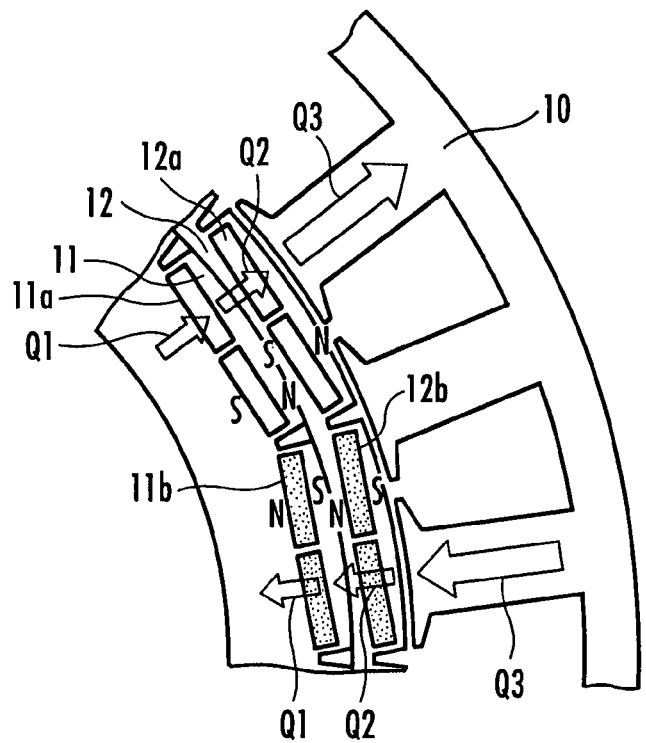
FIG. 3 is an explanatory diagram of an advantage provided by changing the phase difference between the outer rotor and the inner rotor.
Figure 3:
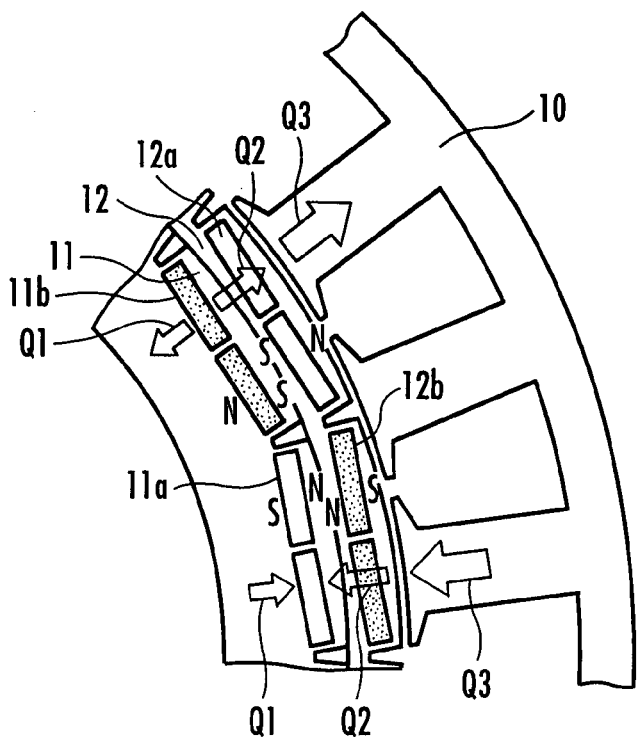
Figure 4:
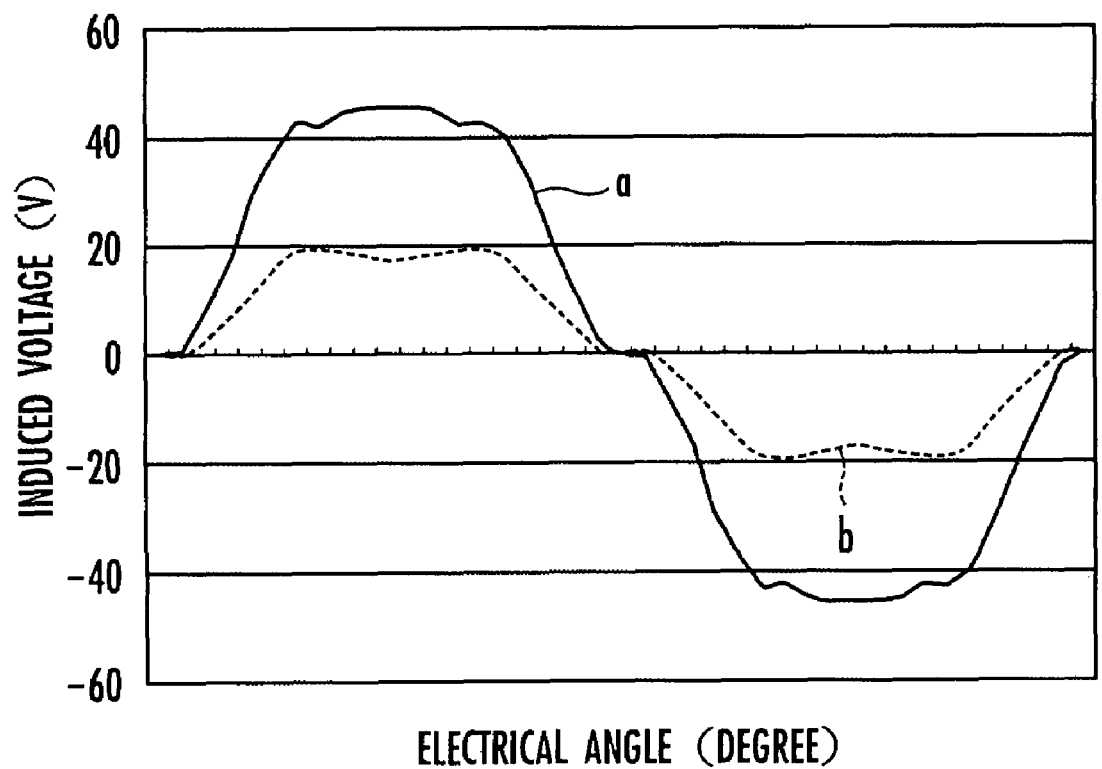
FIG. 4 is another explanatory diagram of the advantage provided by changing the phase difference between the outer rotor and the inner rotor.
Figure 5:
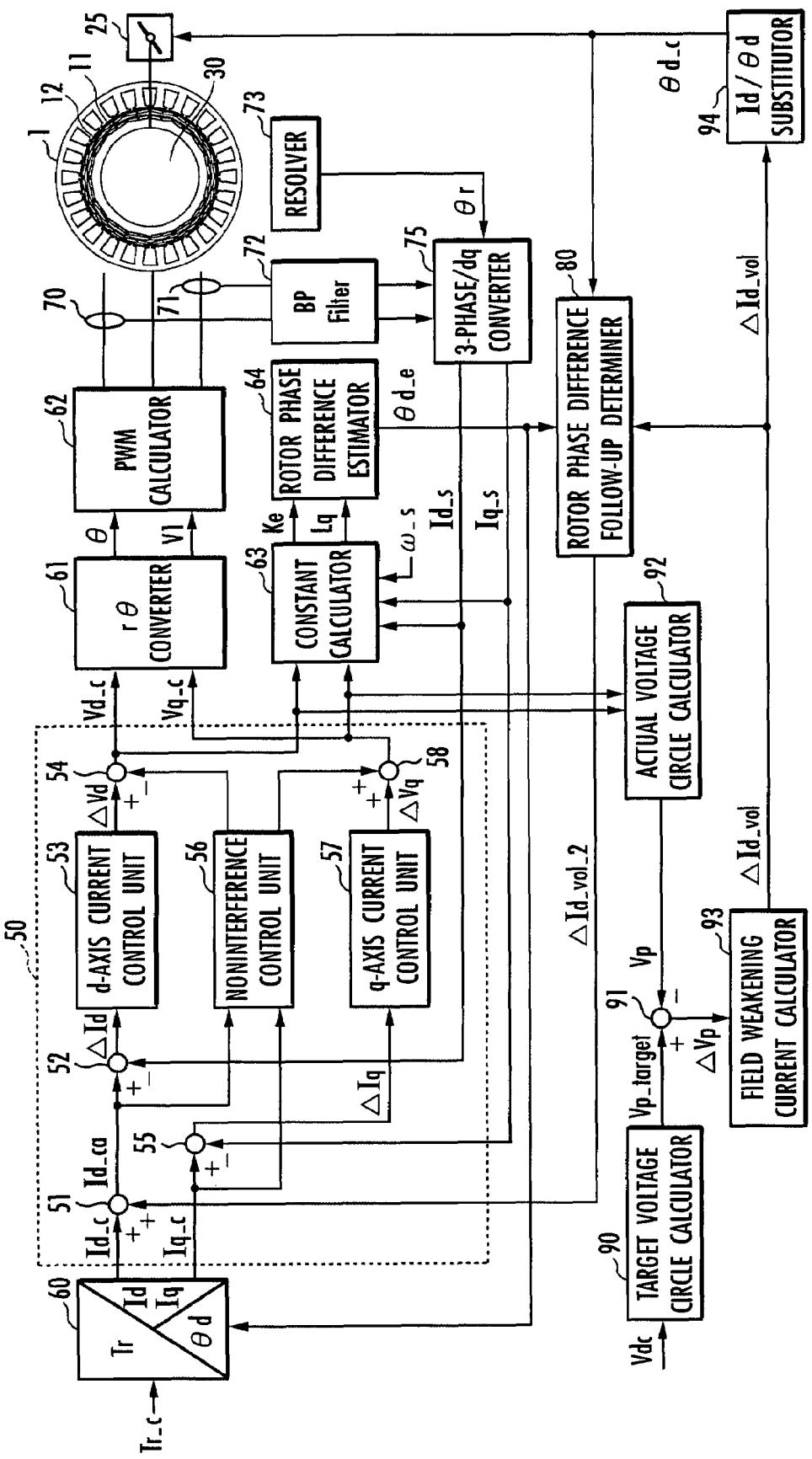
FIG. 5 is a control block diagram of a controller of a motor.
Figure 6:
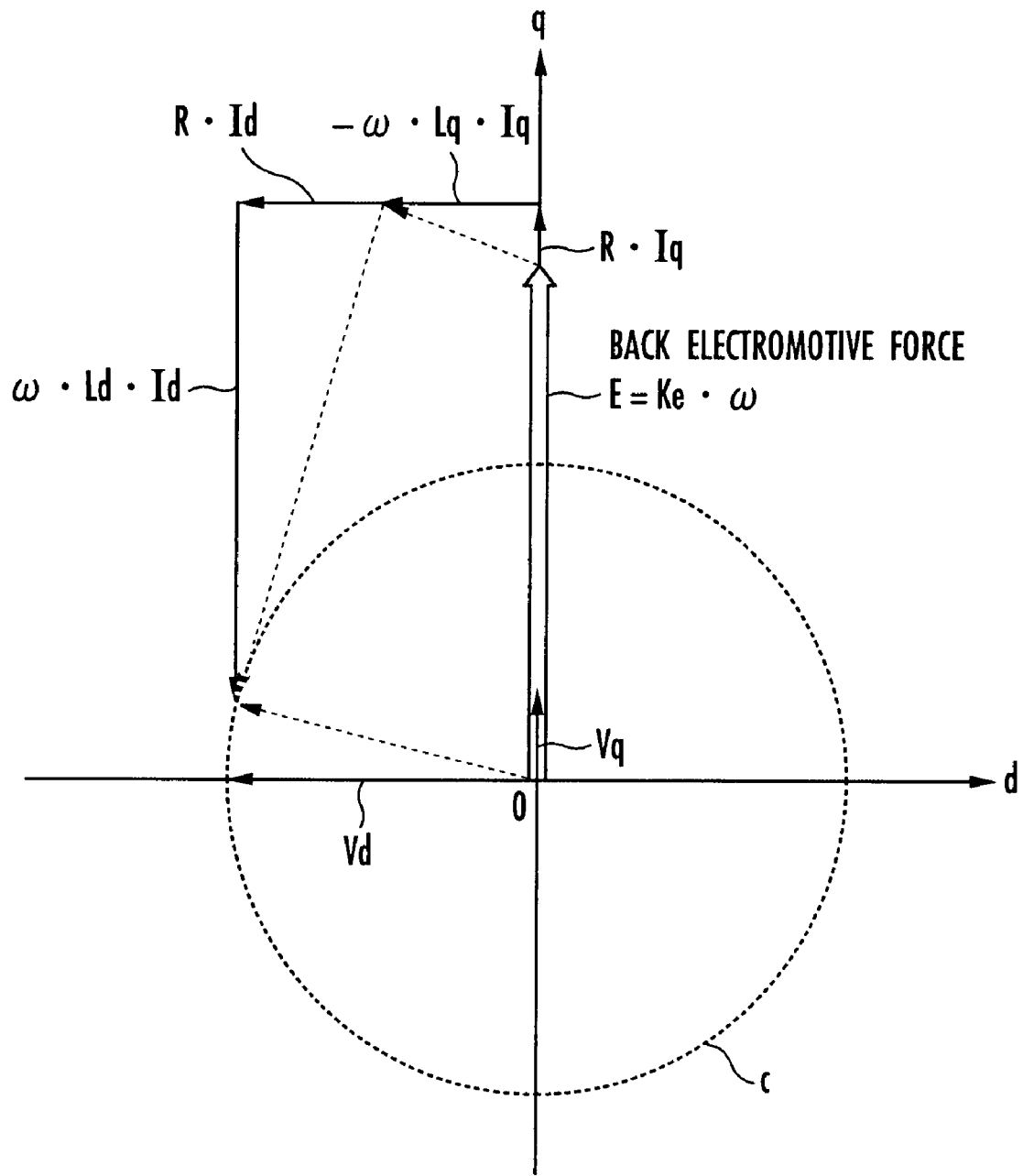
FIG. 6 is a voltage vector diagram in a dq coordinate system.
Figure 7:
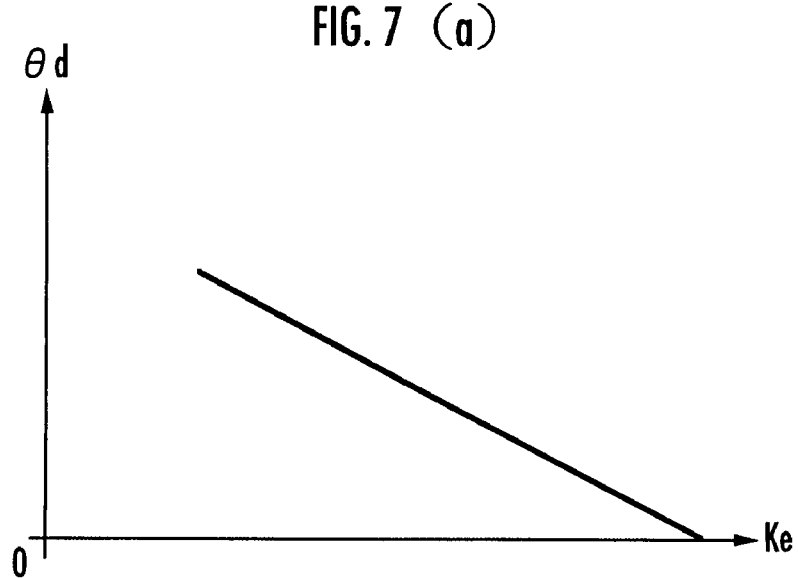
FIG. 7 is an explanatory diagram of a data table for determining an induced voltage constant.
Figure 7:
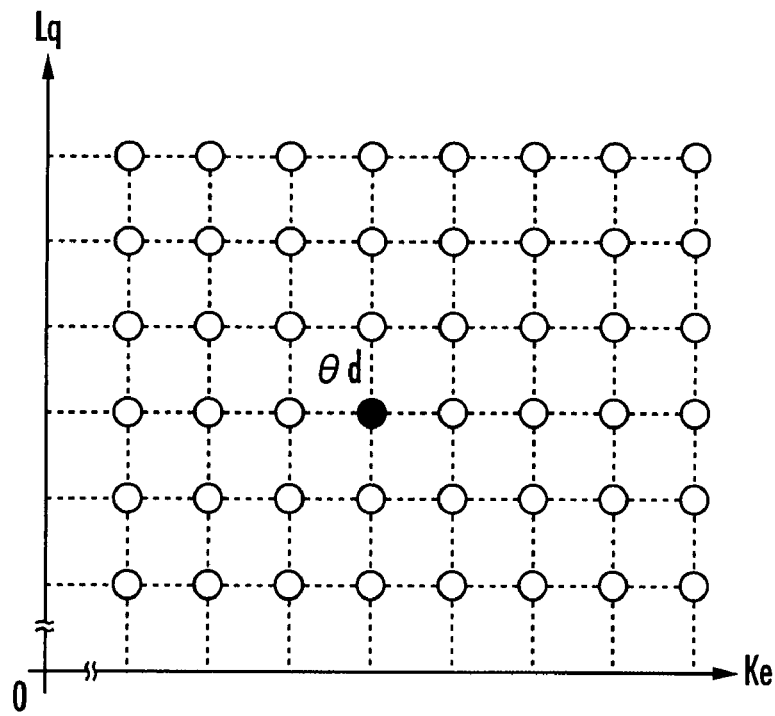
Figure 8:
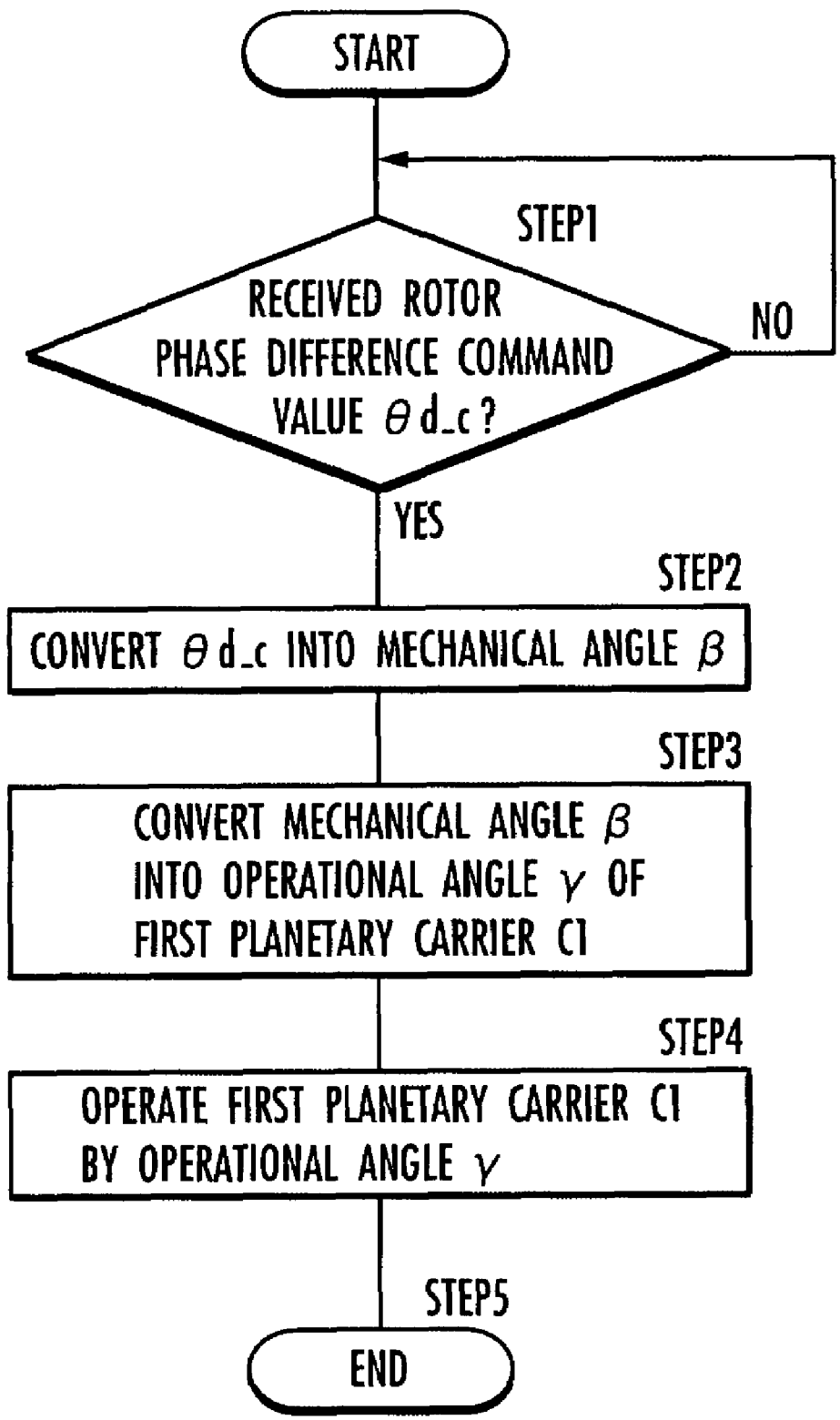
FIG. 8 is a flowchart of processing for changing the phase difference between the outer rotor and the inner rotor.
Figure 9:
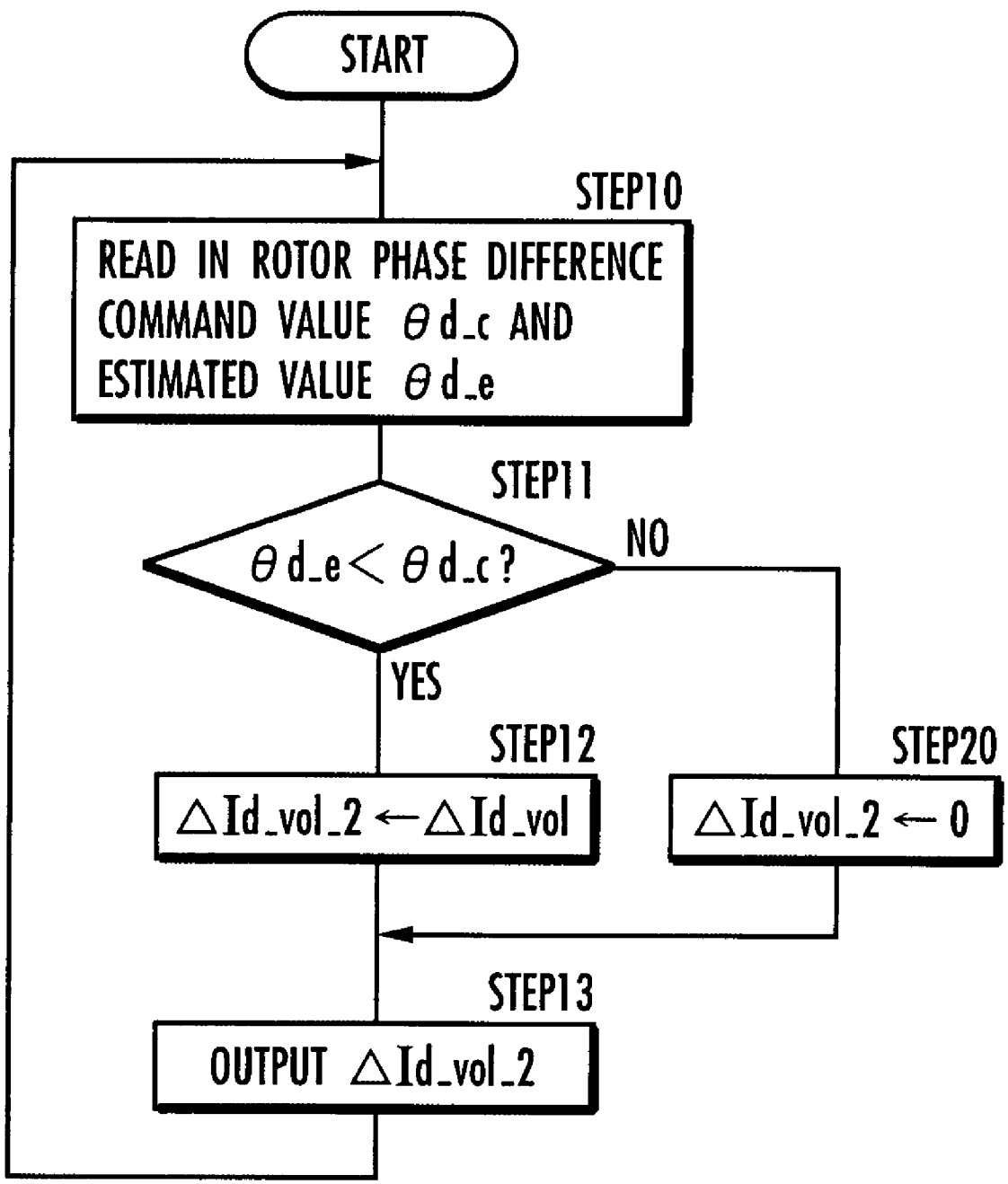
FIG. 9 is a flowchart of processing for compensating for a difference between a command value and an estimated value of the phase difference between the outer rotor and the inner rotor.
Figure 10:
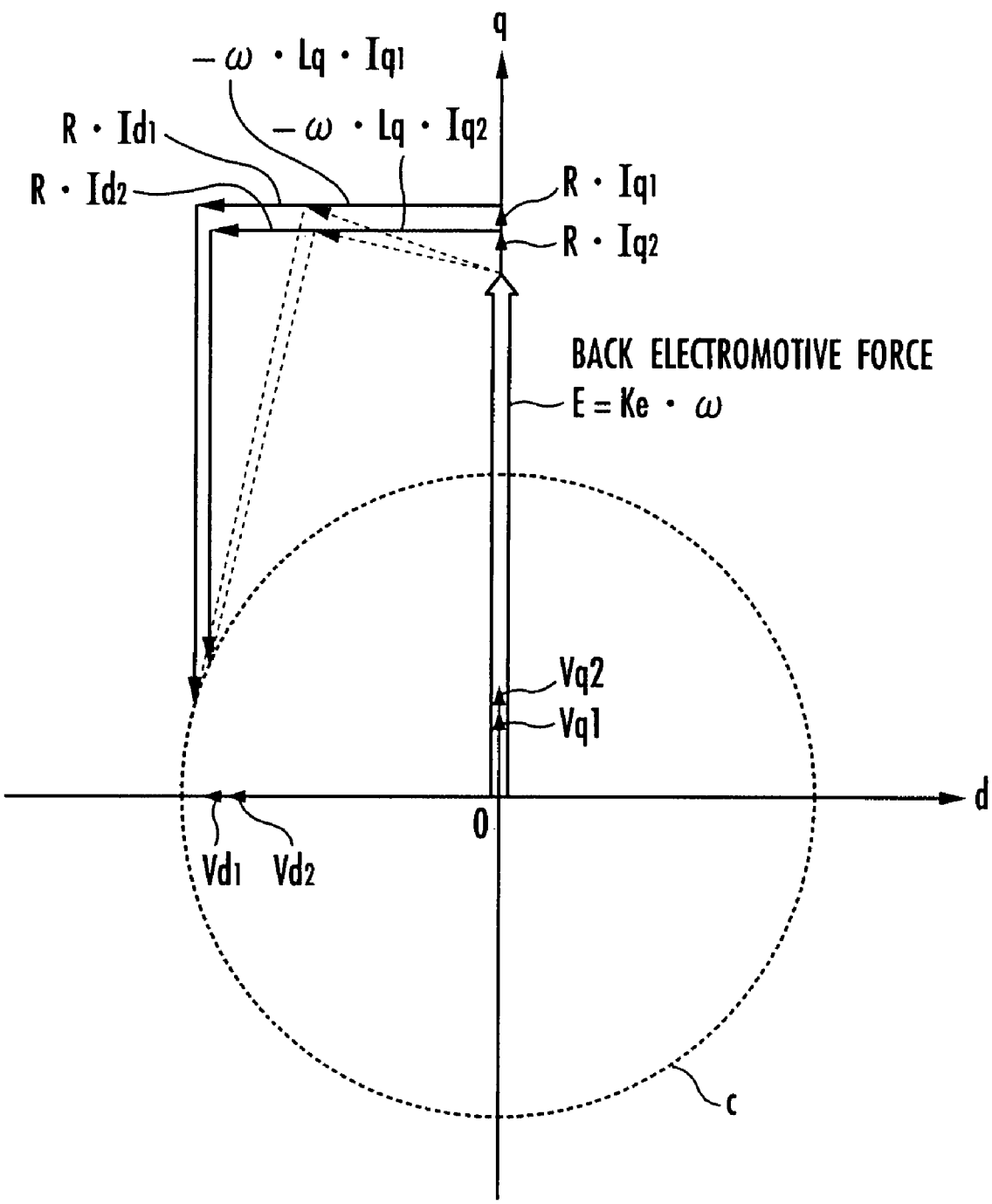
FIG. 10 is an explanatory diagram of processing for improving the accuracy of calculation of an induced voltage constant and an inductance of a q-axis armature.
Figure 11:
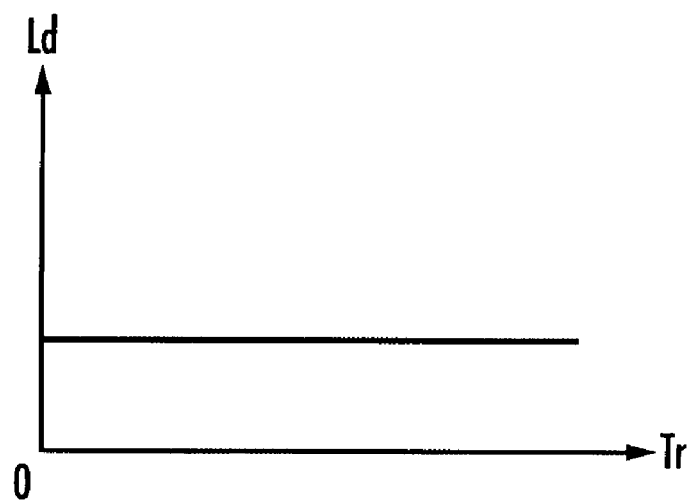
FIG. 11 is an explanatory diagram of a data table used for calculating the induced voltage constant and the inductance of the q-axis armature.
Figure 11:
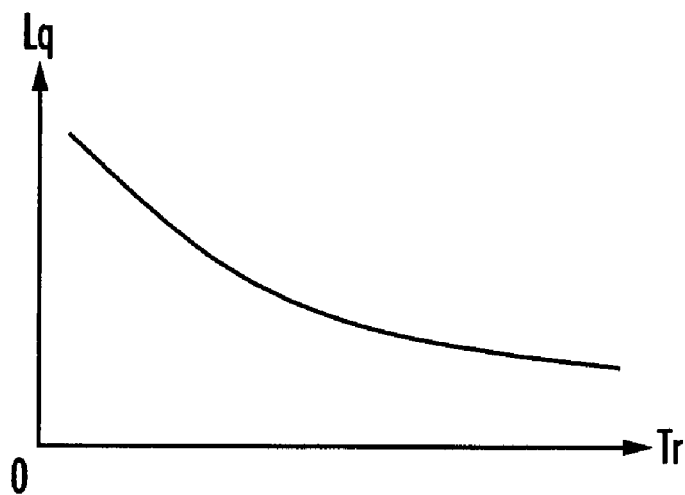
Figure 12:
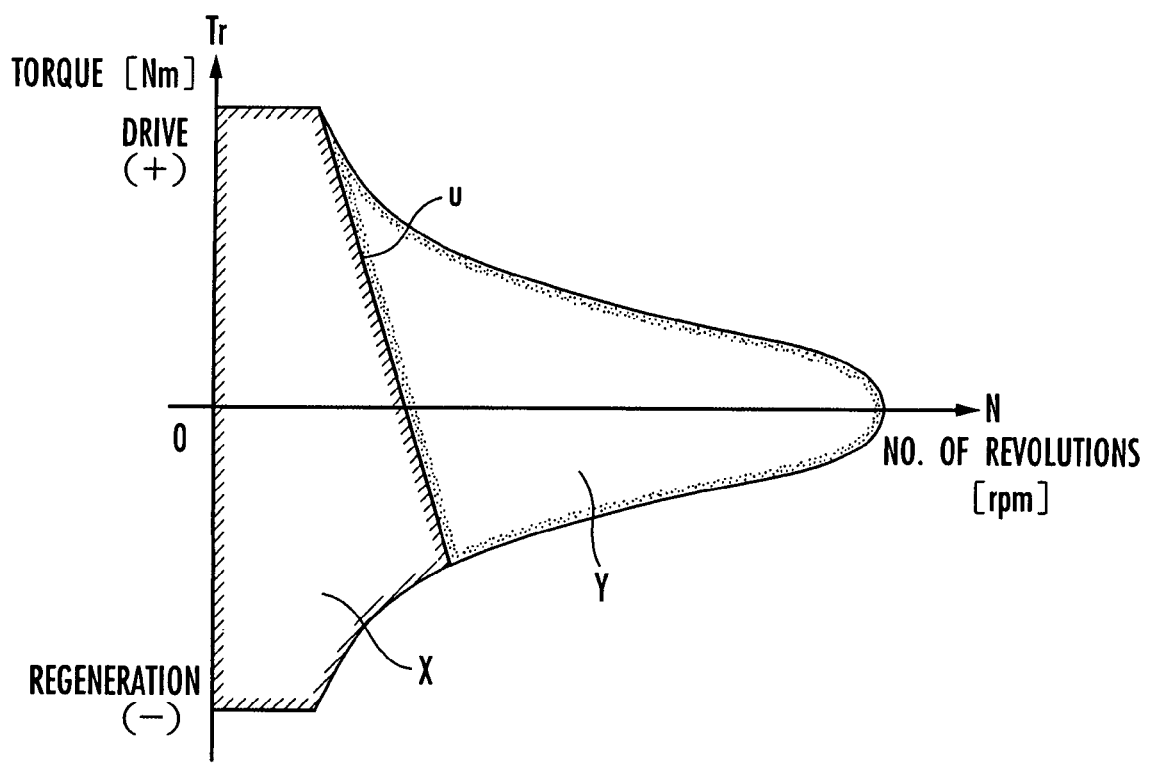
FIG. 12 is an explanatory diagram of the necessity for field weakening control in a drive mode and a regeneration mode.

An embodiment of the present invention will be explained with reference to FIG. 1 to FIG. 11. FIG. 1 is a configuration diagram of a DC brushless motor provided with a double rotor, FIG. 2 is a configuration diagram and an operation explanatory diagram of a mechanism for changing a phase difference between an outer rotor and an inner rotor of a DC brushless motor shown in FIG. 1, FIG. 3 and FIG. 4 are explanatory diagrams of an advantage provided by changing the phase difference between the outer rotor and the inner rotor, FIG. 5 is a control block diagram of a controller of a motor, FIG. 6 is a voltage vector diagram in a dq coordinate system, FIG. 7 is an explanatory diagram of a data table for determining an induced voltage constant, FIG. 8 is a flowchart of processing for changing the phase difference between the outer rotor and the inner rotor, FIG. 9 is a flowchart of processing for compensating for a follow-up delay of an estimated value relative to a command value of the phase difference between the outer rotor and the inner rotor, FIG. 10 is an explanatory diagram of processing for improving the accuracy of calculation of an induced voltage constant, and FIG. 11 is an explanatory diagram of a data table used for calculating the induced voltage constant.

Referring to FIG. 1, a motor 1 in the present embodiment is a DC brushless motor equipped with an inner rotor 11 (corresponding to a second rotor in the present invention) having fields made of permanent magnets 11a and 11b disposed at equal intervals in the circumferential direction, an outer rotor 12 (corresponding to a first rotor in the present invention) having fields made of permanent magnets 12a and 12b disposed at equal intervals in the circumferential direction, and a stator 10 having an armature 10a for producing a rotating magnetic field relative to the inner rotor 11 and the outer rotor 12. The motor 1 is used as a driving source of, for example, a hybrid vehicle or an electric-powered vehicle, and operates as a motor and a generator when it is mounted in a hybrid vehicle.

The inner rotor 11 and the outer rotor 12 are concentrically disposed such that the rotating shafts thereof are both coaxial with a rotating shaft 2 of the motor 1. In the inner rotor 11, the permanent magnets 11a having their south poles adjacent to the rotating shaft 2 and the permanent magnets 11b having their north poles adjacent to the rotating shaft 2 are alternately disposed. Similarly, in the outer rotor 12, the permanent magnets 12a having their south poles adjacent to the rotating shaft 2 and the permanent magnets 12b having their north poles adjacent to the rotating shaft 2 are alternately disposed.

The motor 1 further includes a planetary gear mechanism 30 shown in FIG. 2(a) to change a rotor phase difference, which is a phase difference between the outer rotor 12 and the inner rotor 11. Referring to FIG. 2(a), the planetary gear mechanism 30 is a single-pinion planetary gear mechanism disposed in a hollow portion of the inner rotor 11 on the inner circumferential side thereof. The planetary gear mechanism 30 includes a first ring gear R1 coaxially and integrally formed with the outer rotor 12, a second ring gear R2 coaxially and integrally formed with the inner rotor 11, a first planetary gear 31 engaging with the first ring gear R1, a second planetary gear 32 engaging with the second ring gear R2, a sun gear S, which is an idle gear engaging with the first planetary gear 31 and the second planetary gear 32, a first planetary carrier C1 which rotatively supports the first planetary gear 31 and which is rotatively supported by the rotating shaft 2, and a second planetary carrier C2 which rotatively supports the second planetary gear 32 and which is secured to the stator 10.

In the planetary gear mechanism 30, the first ring gear R1 and the second ring gear R2 have approximately the same gear configuration, and the first planetary gear 31 and the second planetary gear 32 have approximately the same gear configuration. The rotating shaft 33 of the sun gear S is coaxially disposed with the rotating shaft 2 of the motor 1 and rotatively supported by a bearing 34. Thus, the planetary gear mechanism 30 is configured such that the first planetary gear 31 and the second planetary gear 32 engage with the sun gear S and the outer rotor 12 and the inner rotor 11 rotate in synchronization.

Further, a rotating shaft 35 of the first planetary carrier C1 is coaxially disposed with the rotating shaft 2 of the motor 1 and connected to an actuator 25. The second planetary carrier C2 is secured to the stator 10.

The actuator 25 hydraulically causes the first planetary carrier C1 to rotate in the forward direction or the reverse direction or restricts the rotation of the first planetary carrier C1 about the rotating shaft 2 in response to a control signal input from an external source. Then, as the first planetary carrier C1 is rotated by the actuator 25, a relative positional relationship (phase difference) between the outer rotor 12 and the inner rotor 11 changes. The planetary gear mechanism 30 and the actuator 25 constitute the rotor phase difference changer in the present invention.

FIG. 2(b) shows a relationship among the rotational velocities of the first ring gear R1, the first planetary carrier C1, the sun gear S, the second planetary carrier C2, and the second ring gear R2 in the planetary gear mechanism 30, the axis of ordinates indicating a rotational velocity Vr.

Referring to FIG. 2(b), the velocity of the second planetary carrier C2 secured to the stator 10 is zero. This means that, for example, when the sun gear S rotates in the reverse direction (Vr<0), the second ring gear R2 and the inner rotor 11 rotate in the forward rotational direction (Vr>0) at a velocity based on a ratio g2 of the sun gear S relative to the second ring gear R2.

If the actuator 25 is not in operation (if the first planetary carrier C1 is not being rotated by the actuator 25), then the rotational velocity of the first planetary carrier C1 is zero.

Hence, the first ring gear R1 and the outer rotor 12 rotate in the reverse direction relative to the rotating sun gear S at a velocity based on the gear ratio g1 of the sun gear S relative to the first ring gear R1. The gear ratio g1 and a gear ratio g2 are set to be approximately the same (g1≈g2), so that the inner rotor 11 and the outer rotor 12 rotate in synchronization, thus maintaining the phase difference between the inner rotor 11 and the outer rotor 12 at a constant value.

If the actuator 25 is in operation (if the first planetary carrier C1 is being rotated by the actuator 25), then the first ring gear R1 and the outer rotor 12 rotate in the reverse direction relative to the rotating sun gear S at a velocity obtained by increasing or decreasing a velocity based on the gear ratio g1 of the sun gear S relative to the first ring gear R1 by the rotational amount of the first planetary carrier C1. This changes the phase difference between the outer rotor 12 and the inner rotor 11.

The actuator 25 is constructed so as to be capable of rotating the first planetary carrier C1 in the forward direction or the reverse direction by at least a mechanical angle β (degrees)= $(180/P)*g1/(1+g1)$ relative to the gear ratio g1 of the sun gear S to the first ring gear R1 and a number of pairs of poles P of the motor 1.

Therefore, the phase difference between the outer rotor 12 and the inner rotor 11 can be changed toward an advance angle or a delay angle within the range of at least 180 degrees in terms of electrical angle. In other words, the motor 1 can be set, as appropriate, between a field-weakening mode wherein the permanent magnets 12a and 12b of the outer rotor 12 and the permanent magnets 11a and 11b of the inner rotor 11 are disposed with the same poles thereof opposing each other and a field-strengthening mode wherein the permanent magnets 12a and 12b of the outer rotor 12 and the permanent magnets 11a and 11b of the inner rotor 11 are disposed with opposite poles thereof opposing each other.

FIG. 3(a) shows the field-strengthening mode. The directions of magnetic fluxes Q2 of the permanent magnets 12a and 12b of the outer rotor 12 and the directions of magnet fluxes Q1 of the permanent magnets 11a and 11b of the inner rotor 11 are the same, leading to larger composite magnetic fluxes Q3. Meanwhile, FIG. 3(b) shows the field-weakening mode. The directions of the magnetic fluxes Q2 of the permanent magnets 12a and 12b of the outer rotor 12 and the directions of the magnet fluxes Q1 of the permanent magnets 11a and 11b of the inner rotor 11 are opposite to each other, leading to smaller composite magnetic fluxes Q3.

FIG. 4 shows a graph comparing induced voltages produced in the armature of the stator 10 when the motor 1 is run at a predetermined number of revolutions in the mode shown in FIG. 3(a) and in the mode shown in FIG. 3(b), respectively, the axis of ordinates indicating induced voltage (V) and the axis of abscissas indicating electrical angle (degrees). In the graph, "a" denotes the mode shown in FIG. 3(a)(the field-strengthening mode), while "b" denotes the mode shown in FIG. 3(b)(the field-weakening mode). FIG. 4 shows that changing the phase difference between the outer rotor 12 and the inner rotor 11 causes a significant change in an induced voltage that is generated.

Thus, the induced voltage constant Ke of the motor 1 can be changed by increasing or decreasing the magnetic fluxes of the fields by changing the phase difference between the outer rotor 12 and the inner rotor 11. This makes it possible to expand an operative range relative to outputs and the number of revolutions of the motor 1, as compared with a case where the induced voltage constant Ke remains constant. Moreover, the running efficiency of the motor 1 can be enhanced, because the copper loss of the motor 1 reduces, as compared with a case where the field weakening control is conducted by energizing the armature on the d-axis (field axis) by dq coordinate conversion, which is commonly used for controlling a motor.

Referring now to FIG. 5 to FIG. 9, the controller for a motor in accordance with the present invention will be explained. The controller for a motor shown in FIG. 5 (hereinafter referred to simply as "the controller") converts the motor 1 into an equivalent circuit based on a two-phase DC rotating coordinate system in which the direction of field is indicated by the d-axis, while the direction that is orthogonal to the d-axis is indicated by the q-axis. The controller controls the amount of current supplied to the motor 1 such that torque based on a torque command value Tr_c received from an external source is output from the motor 1.

The controller is an electronic unit composed of a CPU, memories, and so on, and includes a current command value determiner 60 which determines a command value Id_c of the amount of current to be supplied to the armature disposed on the d-axis (hereinafter referred to as "the d-axis armature") (hereinafter referred to as "the d-axis current") and a command value Iq_c of the amount of current to be supplied to the armature disposed on the q-axis (hereinafter referred to as "the q-axis armature") (hereinafter referred to as "the q-axis current") on the basis of a torque command value Tr_c and an estimated value θd_e of the phase difference between the outer rotor 12 and the inner rotor 11 (rotor phase difference) of the motor 1, a three-phase/dq converter 75 which calculates a d-axis current detection value Id_s and a q-axis current detection value Iq_s by three-phase/dq conversion on the basis of current detection signals which are detected by current sensors 70 and 71 (corresponding to the current detector in the present invention) and from which unwanted components have been removed by a band-pass filter 72, and a rotor angle θr of the outer rotor 12 detected by a resolver 73 (corresponding to the rotor position detector in the present invention), an energization control unit 50 which determines a command value Vd_c of a voltage to be applied to the d-axis armature (hereinafter referred to as "the d-axis voltage") and a command value Vq_c of a voltage to be applied to the q-axis armature (hereinafter referred to as "the q-axis voltage") such that a difference between the command value Id_c and the detection value Id_s of the d-axis current and a difference between the command value Iq_c and the detection value Iq_s of the q-axis current are reduced, an rθ converter 61 which converts the command value Vd_c of the d-axis voltage and the command value Vq_c of the q-axis voltage into a component of a magnitude V1 and a component of an angle θ, and a PWM calculator 62 which converts the components of the magnitude V1 and the angle θ into a three-phase (U, V, W) AC voltage by PWM control. The current command value determiner 60 and the energization control unit 50 constitute the energization controller in the present invention.

The controller is further equipped with a constant calculator 63 (including the induced voltage constant calculator and the q-axis armature inductance calculator in the present invention) which calculates the induced voltage constant Ke of the motor 1 and the inductance Lq of the q-axis armature on the basis of the d-axis voltage command value Vd_c, the q-axis voltage command value Vq_c, the d-axis current detection value Id_s, the q-axis current detection value Iq_s, and an angular velocity detection value ω_s (detected by an angular velocity detector, which is not shown), a phase difference estimator 64 (corresponding to the rotor phase difference estimator in the present invention) which determines an estimated value θd_e of a rotor phase difference on the basis of the induced voltage constant Ke and the inductance Lq of the q-axis armature, a target voltage circle calculator 90 for calculating a radius Vp_target of a target voltage circle, which will be discussed later, from a supply voltage Vdc of the motor 1, an actual voltage circle calculator 92 for calculating a radius Vp of an actual voltage circle combining the d-axis voltage command Vd_c and the q-axis voltage command Vq_c, which will be discussed later, a subtracter 91 for calculating a difference ΔVp between the radius Vp_target of the desired voltage circle and the radius Vp of the actual voltage circle, a field weakening current calculator 93 for calculating a required current ΔId_vol for field weakening control on the basis of the difference ΔVp, a rotor phase difference command value determiner 94 for determining a rotor phase difference command value θd_c (corresponding to the rotor phase difference command value in the field weakening control in the present invention) for providing a field weakening effect equivalent to the effect obtained by supplying the required current ΔId_vol to the d-axis armature, and a d-axis current corrector 80 (corresponding to the field weakening current corrector in the present invention) for calculating a d-axis current correction value ΔId_vol_2 on the basis of a difference between the command value θd_c and an estimated value θd_e of a rotor phase difference.

The energization control unit 50 is provided with an adder 51 for adding the correction current ΔId_vol_2 to the d-axis current command value Id_c, a subtracter 52 for calculating a difference ΔId between a command value Id_ca with the correction current ΔId_vol_2 added thereto and the d-axis current detection value Id_s, a d-axis current control unit 53 for calculating the d-axis difference voltage ΔVd for producing the difference ΔId, a noninterference control unit 56 for calculating a component (noninterference component) for canceling an influence of speed electromotive forces that interfere with each other between the d-axis and the q-axis on the basis of the d-axis current command value Id_ca after correction and the q-axis current command value Iq_c, a subtracter 54 for subtracting the noninterference component calculated by the noninterference control unit 56 from the d-axis difference voltage ΔVd, a subtracter 55 for calculating a difference ΔIq between the command value Iq_c and the detection value Iq_s of the q-axis current, a q-axis current control unit 57 for calculating a q-axis difference voltage ΔVq for producing the difference ΔIq, and an adder 58 for adding a noninterference component to the q-axis difference voltage ΔVq.

FIG. 6 shows a relationship between current and voltage in the dq coordinate system in which the axis of ordinates indicates the q-axis (torque axis), while the axis of abscissas indicates the d-axis (field axis). Referring to the figure, C denotes a target voltage circle. The controller controls d-axis current and q-axis current such that a vector combining the voltage Vd between the terminals of the d-axis armature and the voltage Vq between the terminals of the q-axis armature (the vector providing the radius of an actual voltage circle) enters the target voltage circle C. In the figure, E denotes a back electromotive force generated in the q-axis armature by the revolution of the motor 1, ω denotes an angular velocity of the motor 1, R denotes resistance of the d-axis armature and the q-axis armature, Lq denotes an inductance of the q-axis armature, Ld denotes an inductance of the d-axis armature, Vd denotes a voltage between the terminals of the d-axis armature, Vq denotes a voltage between the terminals of the q-axis armature, Id denotes d-axis current, and Iq denotes q-axis current.

Regarding a component on the q-axis in FIG. 6, the relationship indicated by expression (1) holds; therefore, the induced voltage constant Ke of the motor 1 can be calculated from expression (2) given below:

$$Ke \cdot \omega + R \cdot Iq = Vq - \omega \cdot Ld \cdot Id \quad (1)$$

where Ke: Induced voltage constant; ω: Angular velocity of motor; R: Resistance of q-axis armature and d-axis armature; Iq: q-axis current; Vq: Voltage across terminals of q-axis armature; Ld: Inductance of d-axis armature; and Id: d-axis current.

$$Ke = \frac{Vq - \omega \cdot Ld \cdot Id - R \cdot Iq}{\omega} \quad (2)$$

Regarding a component on the d-axis in FIG. 6, the relationship indicated by expression (3) given below holds; therefore, the inductance Lq of the q-axis armature can be calculated from expression (4) given below:

$$Vd = R \cdot Id - \omega \cdot Lq \cdot Iq \quad (3)$$

$$Lq = \frac{R \cdot Id - Vd}{\omega \cdot Iq} \quad (4)$$

The constant calculator 63 substitutes the q-axis command voltage Vq_c, the angular velocity detection value ω_s of the motor 1, the d-axis current detection value Id_s, and the q-axis current detection value Iq_s into Vq, ω, Id and Iq, respectively, of the above expression (2) to calculate the induced voltage constant Ke. The constant calculator 63 also substitutes the d-axis current detection value Id_s, the d-axis voltage command value Vd_c, the angular velocity detection value ω_s of the motor 1, and the q-axis current detection value Iq_s into Id, Vd, ω, Iq, respectively, of the above expression (4) to calculate the inductance Lq of the q-axis armature.

The resistance R of the d-axis armature and the q-axis armature in expression (2) and expression (4) shown above take preset fixed values. The inductance Ld of the d-axis armature in expression (2) may take a preset fixed value; however, the inductance Ld of the d-axis armature decreases as a rotor phase difference increases, so that the inductance Ld may take an estimated value that causes the inductance Ld to decrease as the rotor phase difference command value θd_c increases.

Then, the phase difference estimator 64 determines an estimated value θd_e of a rotor phase difference on the basis of the induced voltage constant Ke and the inductance Lq of the q-axis armature calculated by the constant calculator 63. If the rotor phase difference changes, then the induced voltage constant Ke of the motor 1 and the inductance Lq of the q-axis armature change accordingly.

Hence, the phase difference estimator 64 applies the induced voltage constant Ke and the q-axis armature inductance Lq, which have been calculated by the constant calculator 63, to a correspondence map of Ke and Lq/θd shown in FIG. 7(b) to obtain an associated phase difference θd, and determines the phase difference θd as the estimated value θd_e of the phase difference between the outer rotor 12 and the inner rotor 11.

The correspondence map of Ke and Lq/θ is prepared on the basis of experimental data or computer simulations and stored in a memory (not shown) beforehand. The induced voltage constant Ke calculated by the constant calculator 63 could be applied to the Ke/θd correspondence map shown in FIG. 7(a) to determine θd_e; however, the accuracy of the estimation of a rotor phase difference can be improved by adding the induced voltage constant Ke and by using the inductance Lq of the q-axis armature to determine the estimated value θd_e of a rotor phase difference.

Then, the current command value determiner 60 applies the torque command value Tr_c and the estimated value θd_e of a rotor phase difference to a map of Tr, θd/Id, and Iq to obtain associated Id and Iq, and determines the obtained Id and Iq as a d-axis current command value Id_c and a q-axis current command value Iq_c, respectively. Thus, using the estimated value θd_e of a rotor phase difference makes it possible to determine the d-axis current command value Id_c and the q-axis current command value Iq_c that reflect an actual change in a magnetic flux of a field of the motor 1. Hence, output torques of the motor 1 can be accurately controlled on the basis of the torque command value Tr_c.

Subsequently, the target voltage circle calculator 90 calculates the target voltage Vp_target within an output voltage Vdc of a DC power (not shown). The actual voltage circle calculator 92 calculates the magnitude of a composite vector of the d-axis current command value Id_c and the q-axis current command value Iq_c as an actual voltage Vp. Then, the subtracter 91 calculates a difference ΔVp between the target voltage Vp_target and the actual voltage Vp. The field weakening control unit 93 determines a required current ΔId_vol for field weakening control such that ΔVp>0.

a rotor phase difference command value determiner 94 determines a rotor phase difference command value θd_c that causes a field change corresponding to ΔId_vol. Then, the rotor phase difference command value determiner 94 outputs the rotor phase difference command value θd_c to the actuator 25. The actuator 25 carries out the processing shown in FIG. 8 to change the rotor phase difference.

More specifically, upon receipt of the rotor phase difference command value θd_c in STEP1 of FIG. 8, the actuator 25 converts the θd_c into a mechanical angle β in STEP2. Then, in the following STEP3, the actuator 25 converts the mechanical angle β into an operational angle γ of the first planetary carrier C1, and rotates the first planetary carrier by the operational angle γ in STEP4.

A rotor phase difference follow-up determiner 80 carries out the processing shown in FIG. 9 so as to carry out the processing for compensating for a response delay of the processing of changing the rotor phase difference by the actuator 25. More specifically, the phase difference follow-up determiner 80 reads in the command value θd_c and the estimated value θd_e of the rotor phase difference in STEP10 of FIG. 9 and determines, in the next STEP11, whether the estimated value θd_e is smaller than the command value θd_c.

If the estimated value θd_e is smaller than the command value θd_c (if there is a follow-up delay), then the phase difference follow-up determiner 80 proceeds to STEP12, wherein the phase difference follow-up determiner 80 sets a d-axis current change value ΔId_vol in a d-axis current correction value ΔId_vol_2, and then proceeds to STEP13. Meanwhile, if the command value θd_c is the estimated value θd_e or less (if there is no follow-up delay), then the phase difference follow-up determiner 80 branches to STEP20 from STEP11 to set zero in the d-axis current correction value ΔId_vol_2, and then proceeds to STEP13. The rotor phase difference follow-up determiner 80 outputs the d-axis current correction value ΔId_vol_2 to the adder 51 in STEP13.

Thus, if there is a response delay in changing the rotor phase difference, the adder 51 adds the d-axis current correction value ΔId_vol_2 for the d-axis current change value ΔId_vol to the d-axis current command value Id_c. The increase in the d-axis current adds to the field weakening effect, so that the response delay in changing the rotor phase difference makes it possible to make up for a deficiency in the field weakening attributable to a change of the rotor phase difference.

Referring now to FIG. 10 and FIG. 11, the processing for improving the accuracy in calculating the induced voltage constant Ke when the induced voltage constant Ke is calculated, taking a resistance R of an armature of the motor into account, will be explained.

Referring to FIG. 10, ($Id_1$, $Iq_1$, $Vd_1$, $Vq_1$) denotes (d-axis current detection value Id_s, q-axis current detection value Iq_s, d-axis voltage command value Id_c, q-axis voltage command value Iq_c) at a sampling point $t_1$ of the d-axis current and the q-axis current in a current control cycle $Cy_1$ of the controller. ($Id_2$, $Iq_2$, $Vd_2$, $Vq_2$) denotes (d-axis current detection value Id_s, q-axis current detection value Iq_s, d-axis voltage command value Id_c, q-axis voltage command value I_c) at a sampling point $t_2$ of the d-axis current and the q-axis current in a last control cycle $Cy_2$ of the controller. The data of the ($Id_2$, $Iq_2$, $Vd_2$, $Vq_2$) at $t_2$ is stored in a memory.

The control cycle of the controller is short and an influence of a temperature change in an armature coil of the motor 1 or temperature changes in the inner rotor 11 and the outer rotor 12 are ignorable during the period from $t_1$ to $t_2$, and it can be assumed that a phase difference between the inner rotor 11 and the outer rotor 12 remains unchanged.

Hence, the constant calculator 63 takes the difference between the following expression (5) obtained by substituting ($Id_1$, $Iq_1$, $Vd_1$) at $t_1$ into the above expression (3) and the following expression (6) obtained by substituting ($Id_2$, $Iq_2$, $Vd_2$) at $t_2$ into the above expression (3) to provide expression (7) given below. Then, Lq obtained by using a correspondence map of the inductance Lq of the q-axis armature and the output torque Tr of the motor 1 (Lq/Tr map) shown in FIG. 11(b) is substituted into expression (7) to calculate the resistance R of the armature. The Lq/Tr map shown in FIG. 11(b) has been determined using experimental data or computer simulations on the basis of a characteristic in which the inductance Lq of the q-axis armature changes according to output torque of the motor 1.

$$Vd_1 = R \cdot Id_1 - \omega \cdot Lq \cdot Iq_1 \tag{5}$$

where $Vd_1$: Voltage across terminals of d-axis armature at $t_1$; R: Resistance of q-axis armature and d-axis armature; $Id_1$: d-axis current at $t_1$; ω: Angular velocity of motor; Lq: Inductance of q-axis armature; and $Iq_1$: q-axis current at $t_1$.

$$Vd_2 = R \cdot Id_2 - \omega \cdot Lq \cdot Iq_2 \tag{6}$$

where $Vd_2$: Voltage across terminals of d-axis armature at $t_2$; R: Resistance of q-axis armature and d-axis armature; $Id_2$: d-axis current at $t_2$; ω: Angular velocity of motor; Lq: Inductance of q-axis armature; and $Iq_2$: q-axis current at $t_2$.

$$R = \frac{(Vd_1 - Vd_2) + \omega \cdot Lq \cdot (Iq_1 - Iq_2)}{(Id_1 - Id_2)} \tag{7}$$

If the resistance R is calculated according to the following expression (8), which has been derived from the above expression (5), a calculation error of R will inconveniently increase if $Id_1$ is not more than a predetermined value which has been set in the vicinity of zero.

$$R = \frac{Vd_1 + \omega \cdot Lq \cdot Iq_1}{Id_1} \quad (8)$$

The constant calculator 63 sets the command value Id_c of the d-axis current such that the d-axis current $Id_1$ at $t_1$ and the d-axis current $Id_2$ at $t_2$ will be minute currents with opposite signs. This causes an absolute value of $Id_1$-$Id_2$ in the denominator of the above expression (7) to be larger than an absolute value of $Id_1$ in the denominator of the above expression (8), thus allowing a calculation error of the resistance R to be reduced. For example, if the current command value determiner 60 is outputting Id_c≈0, setting the command value Id_c of the d-axis current of the control cycle $Cy_1$ to 0.1 and the command value Id_c of the d-axis current of the control cycle $Cy_2$ to −0.1 makes it possible to increase the denominator of the above expression (7) to $Id_1$−$Id_2$=0.1−(−0.1)=0.2. In this case, the mean value of the d-axis currents in the control cycles $Cy_1$ and $Cy_2$ is zero, exerting small influences on the energization control of the motor 1.

Then, the constant calculator 63 substitutes the resistance R calculated according to the above expression (8), the inductance Ld of the d-axis armature shown in FIG. 11(*a*), and Ld obtained according to the correspondence map of the output torque Tr of the motor 1 (Lq/Tr map) into the following expression (9) to calculate the induced voltage constant Ke.

$$Ke = \frac{(Vq_1 - Vq_2) - \omega \cdot Ld \cdot (Id_1 - Id_2) - R \cdot (Iq_1 - Iq_2)}{\omega} \quad (9)$$

The Ld/Tr map shown in FIG. 11(*a*) has been determined using experimental data or computer simulations on the basis of a characteristic in which the inductance Ld of the d-axis armature changes according to output torque of the motor 1.

Subsequently, the constant calculator 63 applies the induced voltage constant Ke calculated according to the above expression (9) to the correspondence map of Ke/θd shown in FIG. 7(*a*) thereby to determine the estimated value θd_e of the phase difference between the outer rotor 12 and the inner rotor 11 of the motor 1.

Also when determining the rotor phase difference θd according to the aforesaid correspondence map of Ke and Lq/θd shown in FIG. 7(*b*), the calculation errors of the induced voltage constant Ke and the q-axis armature inductance Lq can be reduced in the same manner.

When the inductance Lq of the q-axis armature is calculated according to the following expression (10) obtained by substituting ($Id_1$, $Iq_1$, $Vd_1$) at $t_1$ into the above expression (4), a calculation error of Lq will increase if $Iq_1$ is minute (≈0).

$$Lq = \frac{R \cdot Id_1 - Vd_1}{\omega \cdot Iq_1} \quad (10)$$

Therefore, the constant calculator 63 sets the q-axis current command value Iq_c such that the q-axis current $Iq_1$ at $t_1$ and the q-axis current $Iq_2$ at $t_2$ will be minute currents with opposite signs, and calculates the q-axis armature inductance Lq according to the following expression (11).

$$Lq = \frac{R \cdot (Id_1 - Id_2) - (Vd_1 - Vd_2)}{\omega \cdot (Iq_1 - Iq_2)} \quad (11)$$

This causes an absolute value of ($Iq_1$−$Iq_2$) of the denominator of the above expression (11) to be larger than an absolute value of $Iq_1$ in the denominator of the above expression (10), thus allowing a calculation error of the q-axis armature inductance Lq to be reduced.

The resistance R in the above expression (11) can be calculated according to, for example, the following expressions (12) to (20) related to the motor.

The q-axis current Iq when the motor is being energized will be given according to the following expression (12):

$$Iq = \frac{R(Vq - \omega \cdot Ke) - \omega \cdot Ld \cdot Vd}{R^2 + \omega^2 \cdot Ld \cdot Lq} \quad (12)$$

If the terminals of the d-axis armature and the q-axis armature are short-circuited to set Vd=0 and Vq=0, then the following expression (13) is derived from the above expression (12):

$$Iq = -\frac{R \cdot \omega \cdot Ke}{R^2 + \omega^2 \cdot Ld \cdot Lq} \quad (13)$$

When the d-axis armature and the q-axis armature are short-circuited, if a range is limited such that output torque of the motor remains substantially constant and energizing current also remains constant, then $R^2 \ll \omega^2 Ld \cdot Lq$ holds in the denominator of the above expression (13), thus providing the following expression (14):

$$Iq = -\frac{R \cdot Ke}{\omega \cdot Ld \cdot Lq} \quad (14)$$

The following expression (15) takes into account a difference between a reference temperature $T_0$ and a current temperature $T_c$ and a temperature coefficient Kt of an armature coil. Expression (16) is derived from expression (15) by modifying expression (15) on $T_c$. The above expression (14) is substituted into expression (16) to provide expression (17) given below.

$$Iq = -\frac{R_0\{1 + Kt(T_c - T_0)\} \cdot Ke}{\omega \cdot Ld \cdot Lq} \quad (15)$$

where $R_0$: Resistance value of armature at reference temperature $T_0$; Kt: Temperature coefficient of resistance of armature; and $T_c$: Current temperature.

$$T_c = \frac{-\omega \cdot Ld \cdot Lq \cdot Iq - R_0 \cdot Ke}{Kt \cdot R_0 \cdot Ke} + T_0 \quad (16)$$

$$R = R_0\{1 + Kt(T_c - T_0)\} \quad (17)$$

Then, applying the q-axis armature inductance Lq calculated according to the above expression (11) and the induced voltage constant Ke calculated according to the above expression (9) to the correspondence map of Ke and Lq/θd shown in FIG. 7(b) makes it possible to reduce a calculation error of the rotor phase difference θd when the d-axis current Id and the q-axis current Iq are minute.

The present embodiment has shown the controller for a motor in accordance with the present invention in which the motor 1 is converted into an equivalent circuit based on the dq coordinate system, which is a two-phase DC rotary coordinate system. The present invention is, however, applicable also to a case where the motor 1 is converted into an equivalent circuit based on an αβ coordinate system, which is a two-phase AC fixed coordinate system.

What is claimed is:

1. A controller for a motor adapted to control an operation of a permanent magnet field type rotary motor including a first rotor and a second rotor, which have a plurality of fields made of permanent magnets and which are disposed around a rotating shaft, by carrying out field control as a result of changing a rotor phase difference as a phase difference between the first rotor and the second rotor, the controller comprising:
   a rotor phase difference changing means for changing the rotor phase difference on the basis of a command value of the rotor phase difference in the field control;
   a current detecting means for detecting a current flowing through an armature of the motor;
   a rotor position detecting means for detecting a position of the first rotor;
   an angular velocity detecting means for detecting an angular velocity of the motor;
   an induced voltage constant calculating means which converts the motor into an equivalent circuit based on a two-phase AC fixed coordinate system or a two-phase DC rotary coordinate system based on a position of the first rotor and which calculates an induced voltage constant of the motor on the basis of the converted values of a voltage between the terminals of the armature of the motor and a current flowing through the armature in the equivalent circuit and the angular velocity of the motor;
   a rotor phase difference estimating means for estimating the rotor phase difference on the basis of the induced voltage constant; and
   an energization controlling means for controlling the energization of the motor on the basis of the estimated value of the rotor phase difference provided by the rotor phase difference estimating means.

2. The controller for a motor according to claim 1, wherein the induced voltage constant calculating means controls the amount of energization of the motor such that the signs of converted values in the equivalent circuit of the currents flowing through the armature of the motor at different points will be opposite from each other if the amount of energization of the motor is a predetermined value or less, and calculates an induced voltage constant of the motor on the basis of the difference between the converted values in the equivalent circuit of the voltages between the terminals of the armature of the motor at the different points, the difference between the converted values in the equivalent circuit of the currents flowing through the armature of the motor at the different points, and an angular velocity of the motor.

3. The controller for a motor according to claim 1, further comprising:
   a q-axis armature inductance calculating means for calculating the inductance of an armature disposed on a q-axis on the basis of the converted values in the equivalent circuit of the voltage between the terminals of the armature of the motor and the current flowing through the armature, and the angular velocity of the motor,
   wherein the equivalent circuit is based on a two-phase DC rotary coordinate system composed of a d-axis extended in the direction of a magnetic flux of a field of the motor and the q-axis orthogonal to the d-axis, and
   the rotor phase difference estimating means estimates the rotor phase difference on the basis of the inductance of the armature disposed on the q-axis and the induced voltage constant of the motor.

4. The controller for a motor according to claim 3, wherein the q-axis armature inductance calculating means controls the current flowing through the armature disposed on the q-axis such that the signs of currents flowing through the armature disposed on the q-axis at different points will be opposite from each other if the current flowing through the armature disposed on the q-axis is a predetermined value or less, and calculates an inductance of the armature disposed on the q-axis on the basis of the difference between the converted values in the equivalent circuit of the voltages between the terminals of the armature of the motor at the different points, the difference between the converted values in the equivalent circuit of the currents flowing through the armature of the motor at the different points, and an angular velocity of the motor.

5. The controller for a motor according to claim 4, wherein the induced voltage constant calculating means estimates the inductance of the armature disposed on the d-axis on the basis of a command value of the rotor phase difference in the field control, and calculates the induced voltage constant by using the estimated value of the inductance of the armature disposed on the d-axis.

6. The controller for a motor according to claim 5, further comprising:
   a field weakening current correcting means for controlling the amount of energization of the armature disposed on the d-axis so as to reduce a field weakening shortage due to a change in the rotor phase difference on the basis of a difference between a command value of the rotor phase difference when the field of the motor is weakened by the field control and an estimated value of the rotor phase difference obtained by the phase difference estimating means.

7. The controller for a motor according to claim 3, wherein the induced voltage constant calculating means estimates the inductance of the armature disposed on the d-axis on the basis of a command value of the rotor phase difference in the field control, and calculates the induced voltage constant by using the estimated value of the inductance of the armature disposed on the d-axis.

8. The controller for a motor according to claim 3, further comprising:
   field weakening current correcting means for controlling the amount of energization of the armature disposed on the d-axis so as to reduce a field weakening shortage due to a change in the rotor phase difference on the basis of a difference between a command value of the rotor phase difference when the field of the motor is weakened by the field control and an estimated value of the rotor phase difference obtained by the phase difference estimating means.

* * * * *